United States Patent [19]

Libutti et al.

[11] Patent Number: 5,346,624

[45] Date of Patent: Sep. 13, 1994

[54] METHOD AND APPARATUS FOR TREATMENT OF AQUEOUS SOLUTIONS

[75] Inventors: Bruce L. Libutti, Teaneck; Kurt Bozenmayer, West Milford, both of N.J.

[73] Assignee: The Graver Company, Union, N.J.

[21] Appl. No.: 2,957

[22] Filed: Jan. 11, 1993

[51] Int. Cl.$^5$ ............................ B01O 37/02; C02F 1/42
[52] U.S. Cl. ........................... 210/679; 210/681;
210/777; 210/193; 210/502.1; 210/505
[58] Field of Search .......... 210/679, 663, 777, 502.1,
210/503, 505, 193, 681, 686, 688

[56] References Cited

U.S. PATENT DOCUMENTS

| | | | |
|---|---|---|---|
| 3,250,702 | 5/1966 | Levendusky | 210/24 |
| 3,250,703 | 5/1966 | Levendusky | 210/24 |
| 4,007,301 | 2/1977 | De Martino | 210/778 |
| 4,177,142 | 12/1979 | Halbfoster | 210/75 |
| 4,190,532 | 2/1980 | Halbfoster | 210/75 |
| 4,238,334 | 12/1980 | Holbfoster | 210/679 |
| 4,313,832 | 2/1982 | Shimizu et al. | 210/663 |
| 4,395,335 | 9/1983 | Saito | 210/675 |
| 4,629,571 | 12/1986 | Salem et al. | 210/668 |
| 4,700,723 | 10/1987 | Yoshikawa et al. | 131/334 |
| 4,747,955 | 5/1988 | Kunin | 210/679 |

FOREIGN PATENT DOCUMENTS 1167404  7/1986  Japan ................................. 210/900

OTHER PUBLICATIONS

"Improvement On Condensate Filter", Suzuki et al., May 1990.
"Condensate Demineralizer Performance Summer 1990".

*Primary Examiner*—Cynthia L. Nessler
*Attorney, Agent, or Firm*—Dressler, Goldsmith, Shore & Milnamow, Ltd.

[57] ABSTRACT

A method and apparatus for removing ionic and suspended particulate impurities from a liquid by directing the liquid through a bed including a mixture of ion exchange fibers and inert fibers. The bed also may include a mixture of finely ion exchange particles. The bed may be a precoat layer that is applied on a filter support.

35 Claims, 6 Drawing Sheets

METHOD AND APPARATUS FOR TREATMENT OF AQUEOUS SOLUTIONS

TECHNICAL FIELD

The present invention relates to an improved method for removing ionic and suspended particulate impurities from an aqueous solution containing such impurities. More specifically, the invention relates to a method and apparatus for improving the removal of ionic and suspended particulate impurities from condensate passing through demineralizer filters in power generating plants while increasing the run lengths of such filters.

BACKGROUND OF THE INVENTION

In certain water treatment applications, there is a requirement for the production of extremely pure water, including the removal of both dissolved and suspended or colloidal materials. One area where such a requirement is particularly important is in the steam generation of electrical power, in both fossil fuel and nuclear power plants. In both types of installations, it is common practice to include a filter bed in the recycle stream for the steam turbines.

A significant breakthrough in the purification of such liquid streams is described and claimed in U.S. Pat. Nos. 3,250,702 and 3,250,703, both of which are assigned to the assignee of this application. The invention described in these patents is based on the discovery that when finely divided anion and cation exchange resin particles are mixed in aqueous suspension, a volume increase is noted. This volume increase is the result of an agglomeration or "clumping" between the anion and cation exchange resin particles. Such resin particles, when used to form a filter bed, produce significantly reduced pressure drops across the bed, together with longer run lengths and improved efficiency of dissolved and undissolved solids removal.

As used herein, the term "bed" refers to a layer, such as a precoat layer, which has been deposited on a filter screen, an annular filter cartridge, a film, a deep or shallow bed, or the like. Such a bed may advantageously be deposited on a tubular filter cartridge.

A method for removing impurities from a liquid by passing the liquid through a filter bed which comprises a mixture of oppositely charged particles of filter aid material is described and claimed in U.S. Pat. No. 4,177,142, which patent is assigned to the assignee of this application. The filter aid materials are disclosed as including diatomaceous earth, cellulose fibers, charcoal, expanded pearlite, asbestos fibers, ion exchange resins, and inorganic ion exchangers. The filter bed comprises a mixture of oppositely charged particles of filter aid material. The filter aid particles normally have a surface charge in aqueous suspension. A portion of the particles is treated with a chemical compound to produce a surface charge which is opposite to the normal surface charge. A mixture of oppositely charged particles (normal and reversed) is therefore produced, and the "clumping" phenomenon is achieved.

A method for removing impurities from a liquid by passing the liquid through a filter bed which comprises treated filter aid material is mixed with finely divided ion exchange resin particles in the size range of sixty to four hundred mesh is described and claimed in U.S. Pat. No. 4,190,532. The patent is assigned to the assignee of this application. The mixture of treated filter aid material and ion exchange resin particles produces a clumping phenomenon. The filter aid materials include cellulose fibers, diatomaceous earth, charcoal, expanded pearlite, asbestos fibers and polyacrylonitrile fibers. The ion exchange resin particles include cation exchange resins, anion exchange resins or a mixture of both. The filter aid materials are treated with a chemical compound to produce the required surface charge.

A method for removing impurities from a liquid by passing the liquid through a filter bed which comprises a mixture of a treated fibrous filter aid material and an active particulate material is described in U.S. Pat. No. 4,238,334, which patent is assigned to the assignee of this application. The "fibrous filter aid materials" include cellulose fibers, polyacrylonitrile fibers, Teflon fibers, nylon fibers, rayon fibers, polypropylene fibers, and polyvinyl chloride fibers.

In U.S. Pat. No. 4,747,955 there is described a method for removing impurities wherein polyester fibers are used as a filter aid material in precoat filter formulations. The polyester fibers are treated with a hot caustic solution to convert the normally hydrophobic surface of the fibers to a hydrophilic surface.

In U.S. Pat. No. 4,313,832 there is described a method for purifying aqueous solutions by the use of ion exchange fibers. The ion exchange fibers have a thickness in the range of from about 2 to about 200µm and a length of more than twice the thickness, to intertwine the fibers into a compact mass. The compact mass of fibers is applied as a slurry to a filter support to form a precoat layer thereon. The ion exchange fibers may be cation exchange fibers, anion exchange fibers or a mixture thereof. An alternative embodiment is disclosed wherein the intertwined ion exchange fibers have finely divided ion exchange resin particles of a diameter from about 2 to about 250µm entrained between the ion exchange fibers.

It has been known to provide an overlay layer of ion exchange fibers onto a precoat layer of a mixture of ion exchange resins and cellulose fibers.

It has been found that precoat layers consisting of mixtures of ion exchange resin and inert fibers require a compromise between run length to a pressure drop end point and an iron oxide (crud) removal end point. It has also been found that precoat layers consisting of mixtures of ion exchange fibers and ion exchange resins have unsatisfactory crud removal.

SUMMARY OF THE INVENTION

The present invention is directed to an improved method and apparatus for the utilization of ion exchange fibers for removing ionic and suspended particulate impurities from a liquid containing such impurities. It has been discovered that a bed comprising a mixture of powdered ion exchange resin particles, ion exchange fibers, and relatively inert fibers provides significant removal of ionic and suspended particulate impurities while maintaining satisfactory run lengths. The inert fibers are preferably treated with a polyelectrolyte to produce a clumping phenomenon. The ion exchange fibers may be anion exchange fibers, cation exchange fibers, or a mixture of both.

In accordance with a preferred embodiment of the invention, the bed comprises from about one part ion exchange fibers to about four parts inert fibers to about four parts ion exchange fibers to about one part inert fibers. More preferably the bed comprises approximately equal parts of ion exchange fibers and inert fibers.

In accordance with another preferred embodiment of the invention the bed comprises a mixture of ion exchange fibers, treated inert fibers, and powdered ion exchange particles. The inert fibers are preferably cellulose fibers. The ion exchange particles may be anion exchange particles, cation exchange particles, or a mixture of both. The bed preferably comprises from about five percent to about sixty percent ion exchange fibers, more preferably from about five percent to about thirty percent ion exchange fibers, and most preferably from about fifteen percent to about eighteen percent ion exchange fibers. The bed preferably comprises at least about five percent inert fibers, more preferably about ten percent to about thirty percent inert fibers and most preferably from about fifteen to about eighteen percent inert fibers.

The beds in accordance with the preferred embodiments of the invention also preferably include from about one percent to about ninety percent of ion exchange resin particles having an effective diameter in the range of about one micron to about three hundred microns. It is especially preferred that they also include from about one to about ten percent by weight of ion exchange particles having an effective diameter in the range of about one to about twenty microns.

As used herein the term ion exchange fiber is intended to include materials with a significant ion exchange capacity, for example, greater than about 0.1 milliequivalents/gram, and of a fibrous, elongated shape. The ion exchange fibers have a length dimension which is at least about three times the larger of their height and width dimensions, preferably at least about five times. Examples of preferred ion exchange fibers include Ionex from Toray Industries, Inc. of Tokyo, Japan, Nitivy Ion Exchange Fiber from Nitivy of Tokyo, Japan, and A4-C, available from Japan Organo of Tokyo, Japan. The ion exchange fibers preferably have a length of about $100 \mu m$ to about 1 mm, more preferably of about $200 \mu m$ to about $600 \mu m$ and most preferably about $300 \mu m$.

As used herein the term inert fibers is intended to include fibrous materials without significant ion exchange capacity. Examples of preferred inert fibers include cellulose, for example, BH-20 from International Filler, nylon, polyacrylonitrile, hydrolyzed polyester, and the like. The inert fibers preferably have a length of about $50 \mu m$ to about 1 mm, more preferably of about $75 \mu m$ to about $500 \mu m$ and most preferably of about $75 \mu m$ to about $200 \mu m$. The length of the inert fibers is at least about three times the larger of their height and width dimensions, preferably at least about ten times.

As used herein the term ion exchange resin particles is intended to include anion exchange resin particles, cation exchange resin particles or a mixture thereof. The particles are generally spheroidal, in contrast to the fibers which are generally elongated. Preferably, the particles have been shaped by a grinding process or a milling process. Most preferably, the particles have a length dimension which is no greater than about three times their height or width dimensions. Examples of preferred ion exchange resin particles are described in U.S. Pat. No. 4,190,532, issued to Halbfoster. Preferably, the ion exchange resin particles are substantially in the size range of about thirty-seven microns to two hundred fifty microns and intermixed with a significant proportion of finer resin particles in the range of about one to about ten microns which enhance floc stability. Preferably, the particles are composed of strongly acidic and strongly basic resins based on cross-linked polystyrene. For example, Amberlite IR-120 and Amberlite IRA-400 from Rohm and Haas, and Dowex HCR-S and Dowex SBR from Dow Chemical are preferred ion exchange particles. Weakly acidic resins, for example, Amberlite IRC-76 from Rohm and Haas, may also be utilized.

It is also to be understood in connection with the present application that when ratios or percentages of resins or fibers are discussed, applicant always refers to the dry weight of the material involved.

DESCRIPTION OF PREFERRED EMBODIMENT

In accordance with the present invention a filter bed is provided that includes a mixture of ion exchange fibers and inert fibers. It has been discovered that a bed comprising a mixture of ion exchange fibers and inert fibers provides increased effluent quality and increased run lengths as compared to a bed comprising only ion exchange fibers. It has also been discovered that a bed comprising a mixture of ion exchange fibers, inert fibers, and ion exchange resin particles provides increased effluent quality as compared to a bed comprising only ion exchange fibers and ion exchange resin particles.

In accordance with a first preferred embodiment of the invention a filter bed is provided that includes a mixture of ion exchange fibers and inert fibers. The ion exchange fibers may include anion exchange fibers, cation exchange fibers, or a mixture of both. The inert fibers preferably comprise cellulose fibers, such as fibers commercially available from International Filler, under the trade name BH-20. The inert fibers may be treated with a polyelectrolyte to produce a clumping phenomenon in accordance with the teachings of U.S. Pat. No. 4,190,532, issued to Halbfoster, the disclosure of which patent is incorporated herein by reference.

The bed preferably comprises from about twenty percent to about eighty percent ion exchange fibers, more preferably from about thirty-three percent to about sixty percent ion exchange fibers and most preferably about fifty percent ion exchange fibers.

In accordance with a second preferred embodiment of the invention a filter bed is provided that includes a mixture of ion exchange fibers, inert fibers and finely divided ion exchange particles. The ion exchange fibers may include anion exchange fibers, cation exchange fibers, or a mixture of both. The inert fibers preferably comprise cellulose fibers, such as the above-mentioned fibers commercially available under the trade name BH-20. The inert fibers may be treated with a polyelectrolyte to produce a clumping phenomenon in accordance with the teachings of U.S. Pat. No. 4,190,532. The ion exchange particles may include anion exchange resin particles, cation exchange resin particles, or a mixture of both. Preferably, the ion exchange particles have an effective diameter in the range of about one to about three hundred microns.

The bed preferably comprises from about five percent to about sixty percent ion exchange fibers, more preferably from about five percent to about thirty percent ion exchange fibers, and most preferably from about fifteen percent to about eighteen percent ion exchange fibers. The bed preferably comprises at least about five percent inert fibers, more preferably from about ten percent to about thirty percent inert fibers and most preferably from about fifteen percent to about eighteen percent inert fibers.

In accordance with both of the above described embodiments, the bed may comprise from about one percent to about ten percent of very finely divided ion exchange resin particles having a diameter in the range of about one micron to about twenty microns to increase the stability of the bed, with the balance of the bed being resin particles substantially in the size range of about thirty-seven microns to about two hundred fifty microns.

Pilot Plant Apparatus

Figure 1:
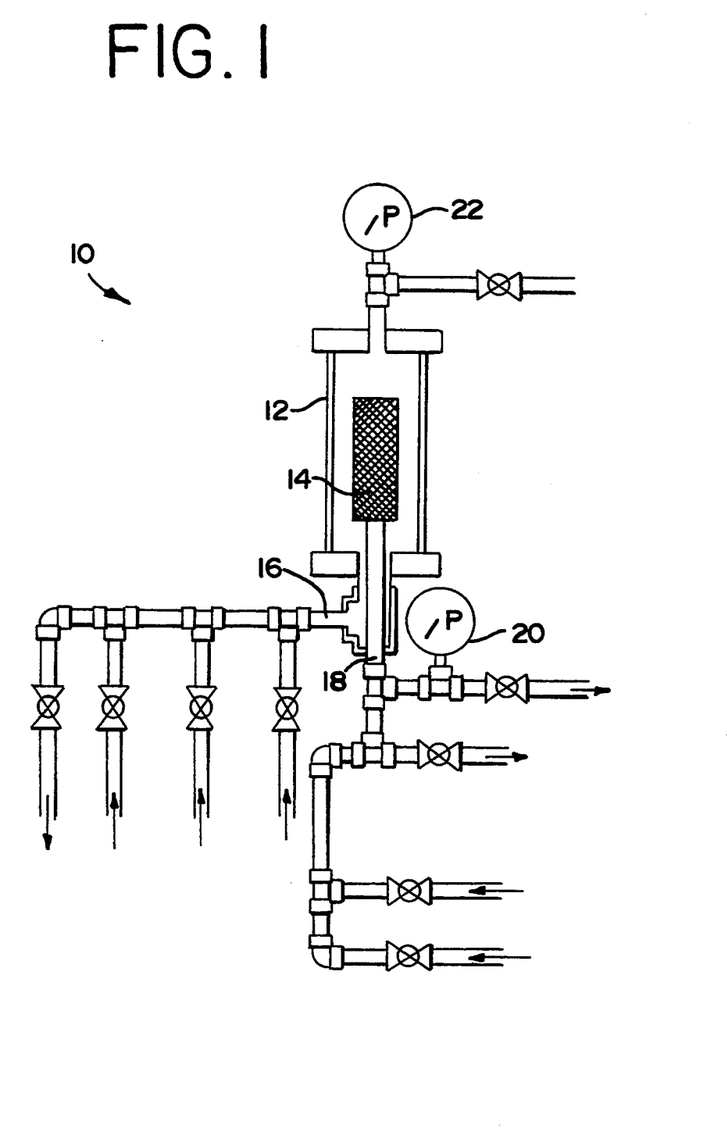
FIG. 1 is a schematic representation of a pilot plant apparatus.

Referring to FIG. 1, there is shown a schematic representation of a pilot plant apparatus 10 that is used to test certain performance characteristics of certain exemplary precoat compositions. Pilot plant 10 includes a housing 12 having a filter element 14 supported therein. An influent or service line 16 communicates with the interior of housing 12 and an effluent line 18 communicates with the interior of element 14. Influent pressure gauge 22 communicates with the interior of housing 12 to monitor the influent pressure. Effluent pressure gauge 20 communicates with effluent line 18 to monitor the effluent pressure. As is schematically shown and well known in the precoat filter art, an influent precoat slurry from a precoat system (not shown) communicates with housing 12 through line 16 and the precoat effluent or return communicates with line 18. An influent backwash water and/or air from a backwash system (not shown) communicates with line 18 and the interior of element 14. A backwash drain communicates with line 16 and the interior of housing 12.

EXAMPLE 1

21.8 dry grams of Ecodex® P-202-HL (manufactured by The Graver Company of Union, N.J.) is deposited as a precoat onto filter element 14. Element 14 is a single, tubular, stainless steel filter element having a nominal particle retention rating of 70 microns, and a surface area available for filtration of 0.2 ft². The composition of the precoat is 29.6% PCH powdered cation exchange resin, 37.1% PAO powdered anion exchange resin, and 33.3% cellulose fiber, conditioned with Betz 1175 and polyacrylic acid in accordance with the teachings of U.S. Pat. No. 4,190,532. The filter element is precoated with the material by adding the material, in its dewatered, as-received form, in increments to a precoat tank (not shown) of the pilot plant over a period of 15 to 20 minutes, and recirculating the slurry through the element until a clear recycle stream is produced indicating that all of the material has been precoated onto the element. This procedure produces a uniform precoat having a depth of about ¼ inch.

An aqueous suspension containing two hundred fifty micro-grams per liter iron as $Fe_2O_3$ is passed through the precoated filter element at a temperature of $15°\pm3°$ C. and at a constant flow rate of 0.72 gallons per minute. Aliquots of the effluent stream are collected, and iron oxide is collected by passing the effluent aliquots through 0.45 micron Millipore membrane filters. The iron oxide concentration is determined by visual comparison to gravimetrically determined stains produced by the same method.

Figure 2:
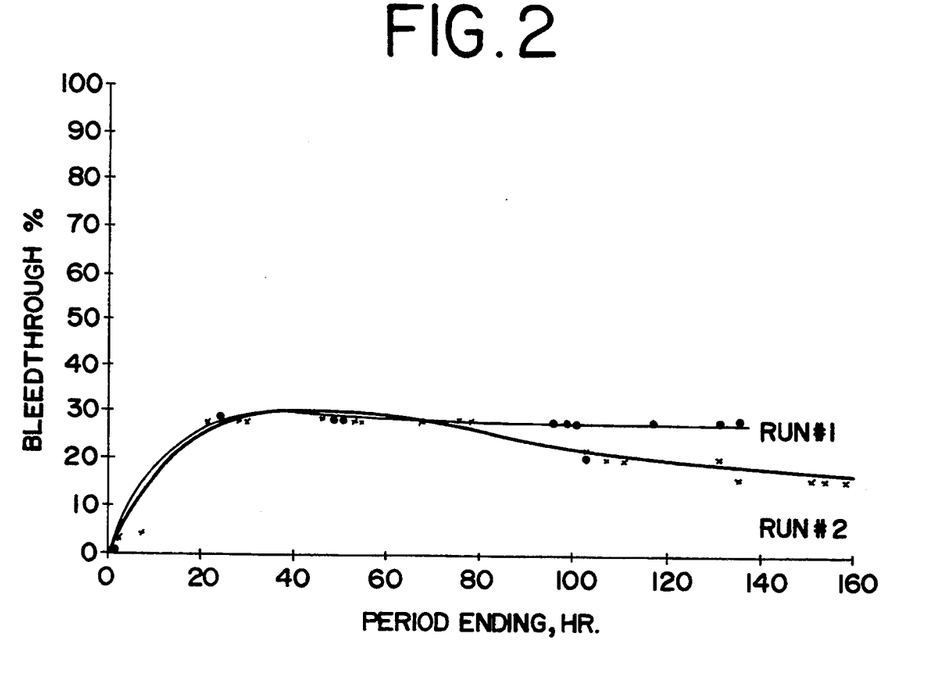
FIG. 2 is a graph showing percentage bleed-through for Run 1 and Run 2 as functions of time.
Figure 3:
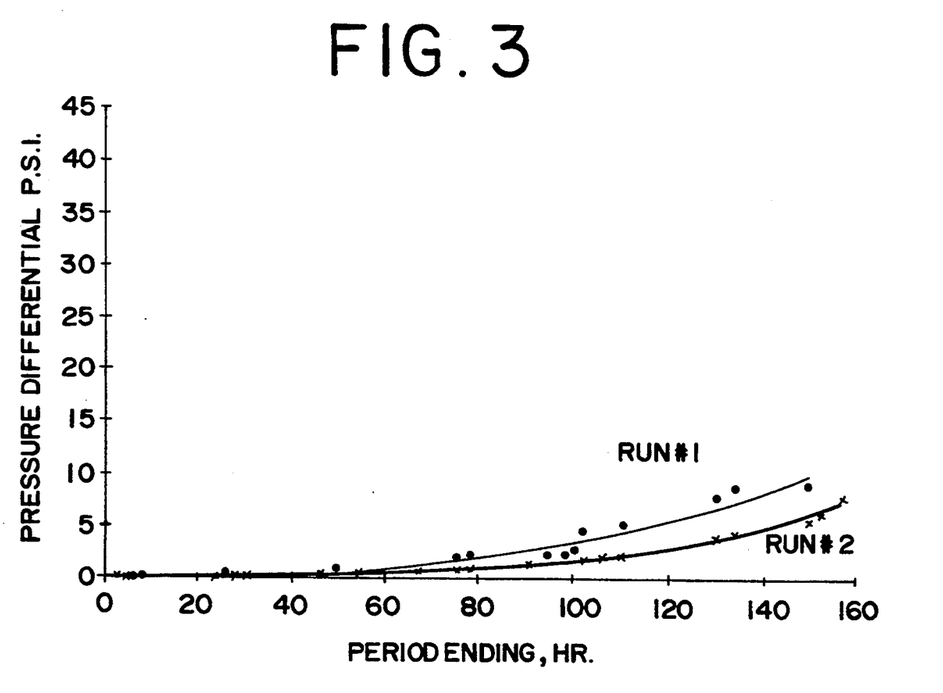
FIG. 3 is a graph showing a pressure drop across a precoat and a filter element for Run 1 and Run 2 as functions of time.

The procedure was performed twice to verify reproducibility, the procedures being respectively designated Run 1 and Run 2. The results of the visual comparisons for Run 1 and Run 2 are shown in FIG. 2, where bleedthrough is the amount of iron oxide passing through the precoat expressed as a percentage of iron oxide entering the precoat. FIG. 3 shows the pressure drop across the precoat and filter element as a function of time for Run 1 and Run 2.

EXAMPLE 2

In order to obtain a comparison with the results set forth above, an identical procedure is twice conducted utilizing a mixture of ion exchange fibers and powdered ion exchange resins similar to the Ecodex® P-202-HL formulation, with the ion exchange fibers replacing the cellulose fiber. The procedures utilizing ion exchange fibers and powdered exchange resins are designated Run 3 and Run 4. The powdered resin ratio is adjusted to maintain stoichiometry. The ion exchange fibers used are Ionex TIN-110H030E produced by Toray Industries Inc. The powdered ion exchange resins are commercial PCH hydrogen form cation exchange resin and PAO hydroxide form anion exchange resin, produced by The Graver Company. 1500 ml of demineralized water is placed in a 2000 mL beaker equipped with a magnetic stirrer, and 6.54 dry grams of Ionex fibers is suspended, utilizing the stirrer. Subsequently, 3.31 dry grams of PCH powdered cation exchange resin is added while stirring is continued, followed by 11.94 dry grams of PAO powdered anion exchange resin. 5.5 mL of a one percent solution of polyacrylic acid is then added, while stirring is continued, in order to clarify the supernate and further reduce the volume of the precoat material.

Figure 4:
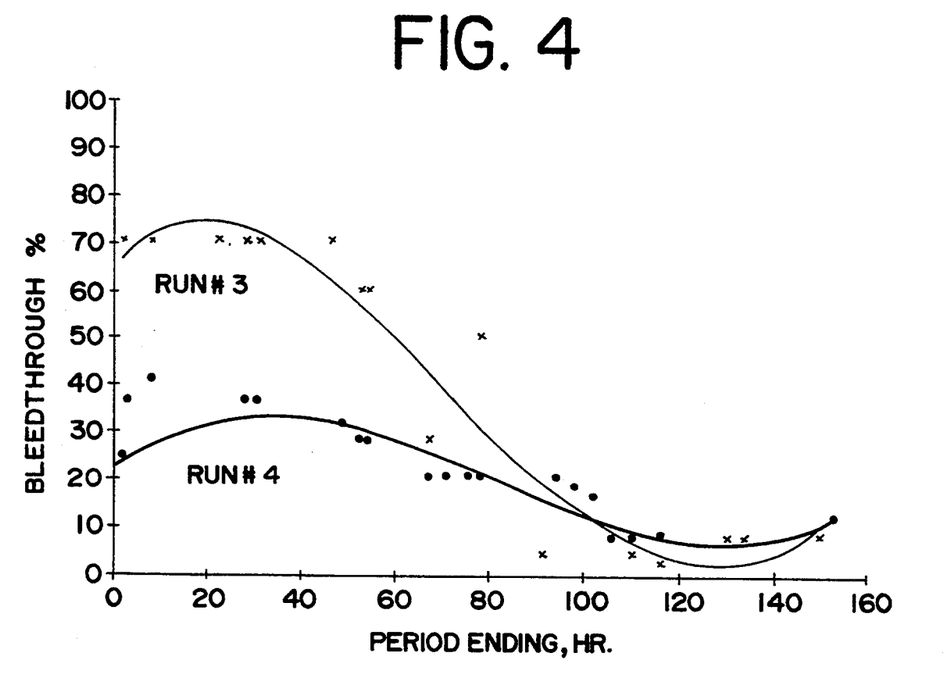
FIG. 4 is a graph showing percentage bleed-through for Run 3 and Run 4 as functions of time.
Figure 5:
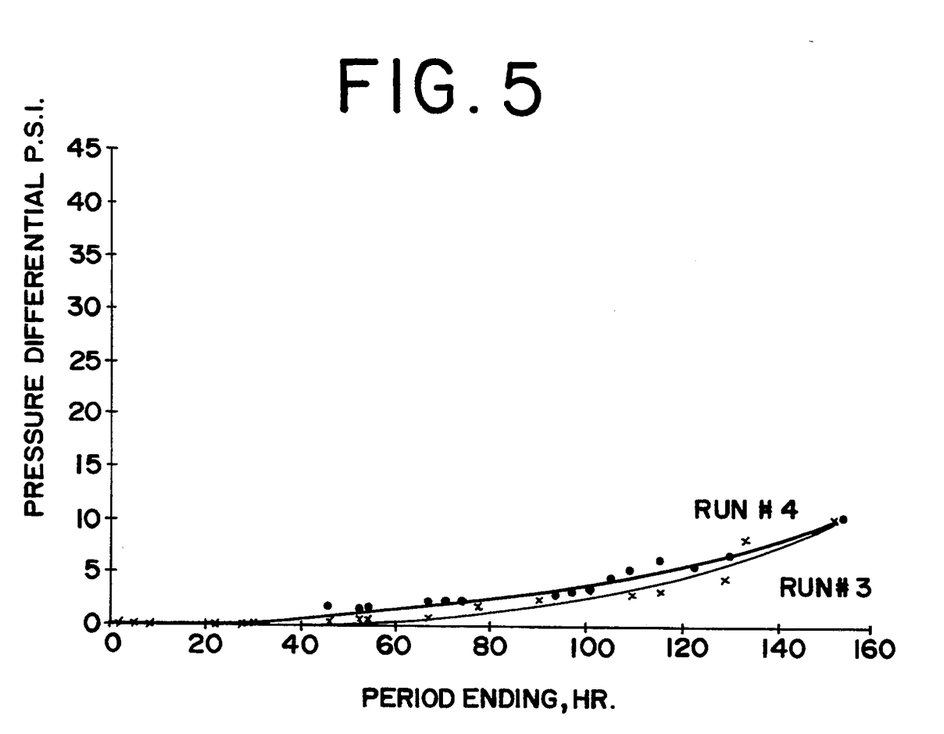
FIG. 5 is a graph showing pressure drop across a precoat and a filter element for Run 3 and Run 4 as functions of time.

This precoat material is deposited on the filter element and challenged by an iron oxide suspension as described for Run 1 and Run 2 of Example 1. The proportion of iron oxide passing through the precoat over time for Run 3 and Run 4, expressed as percentage bleedthrough, is illustrated in FIG. 4. FIG. 5 depicts the pressure drop across the precoat and the filter elements as a function of time for Run 3 and Run 4.

Comparison of FIGS. 4–5 of Example 2 with FIGS. 2–3 of Example 1 reveals that the mixture containing powdered cation and anion ion exchange resin and relatively inert cellulose fibers (Example 1) exhibited much less bleedthrough of iron oxide during the first seventy hours of operation than did the mixture containing powdered cation and anion exchange resin and ion exchange fibers (Example 2). Pressure data performance was approximately equal for the two mixtures.

EXAMPLE 3

Another identical procedure is conducted utilizing a mixture of ion exchange fibers, cellulose fibers, and powdered ion exchange resins similar to the Ecodex® P-202-HL formulation of Example 1, with both ion exchange fibers and cellulose fibers constituting the fiber component. The procedure is designated Run 5.

The powdered resin ratio is adjusted to maintain stoichiometry. 1500 mL of demineralized water is placed in a 2000 mL beaker equipped with a magnetic stirrer, and 3.63 dry grams of BH-20 cellulose fiber is suspended, utilizing the stirrer. The cellulose fiber is treated with 0.5 mL of a 10% solution of Betz 1175 polyelectrolyte while stirring is continued. 3.63 dry grams of Ionex ion exchange fibers is then added to the mixture. Subsequently 4.20 dry grams of PCH powdered cation exchange resin is added, followed by 10.33 dry grams of PAO powdered anion exchange resin. An unrecorded volume of a one percent solution of polyacrylic acid is then added, while stirring is continued, in order to clarify the supernate and further reduce the volume of the precoat material.

This precoat material is then deposited on a filter element and challenged by an ion oxide suspension as described in Example 1. The results for Run 5 are depicted graphically, with FIG. 6 illustrating percentage breakthrough and FIG. 7 showing pressure drop, as functions of time.

Figure 6:
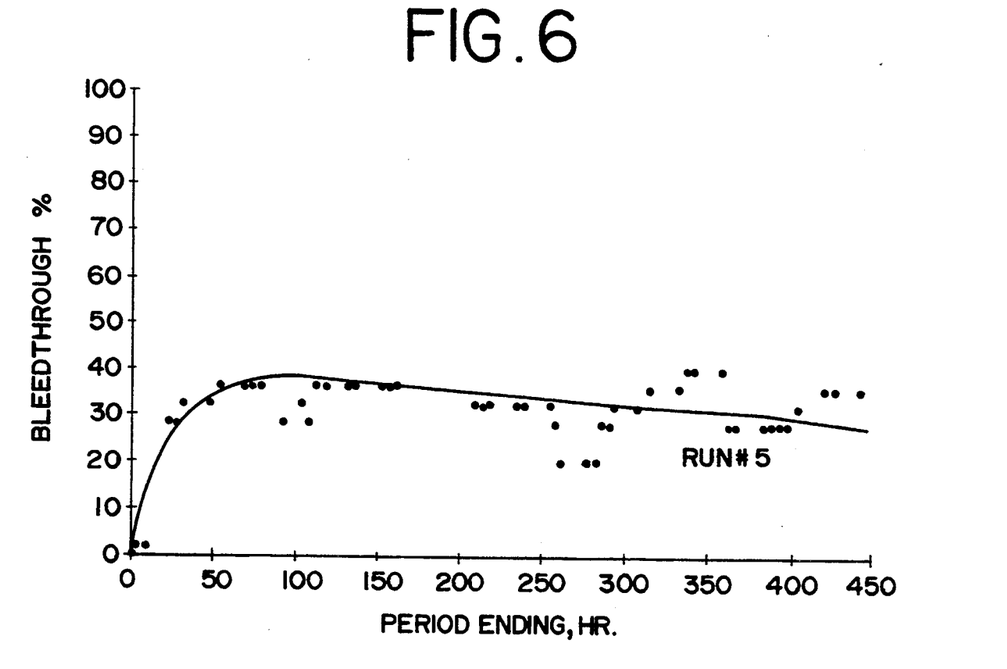
FIG. 6 is a graph showing percentage bleed-through for Run 5 as a function of time.
Figure 7:
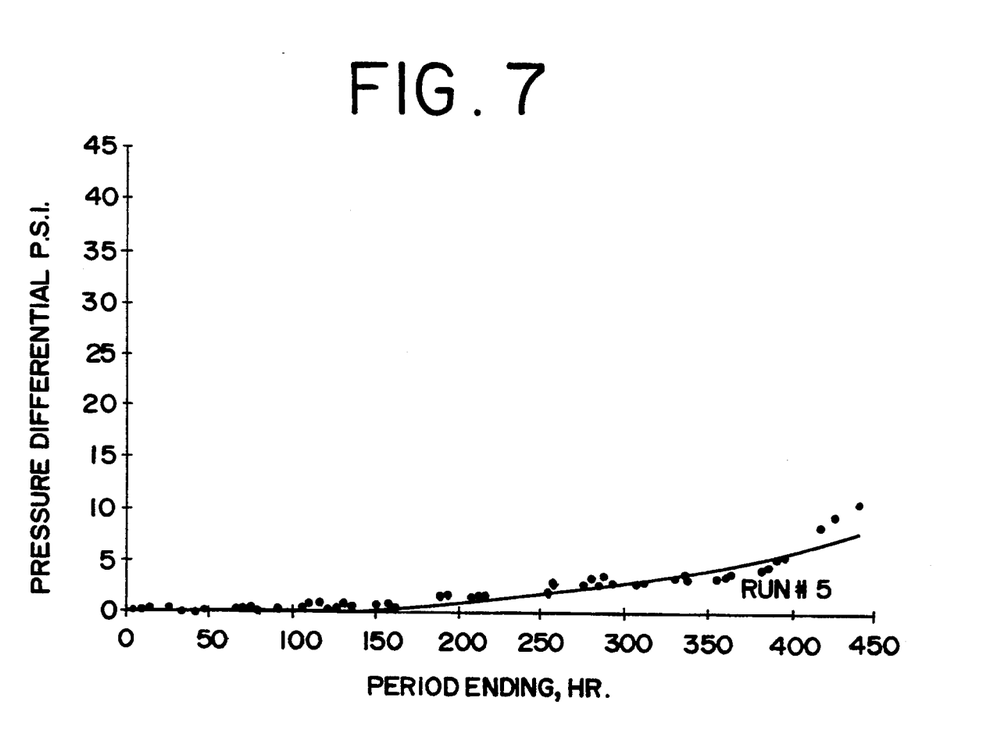
FIG. 7 is a graph showing pressure drop across a precoat and a filter element for Run 5 as a function of time.

Comparison of FIGS. 6–7 with FIGS. 2–3 of Example 1 demonstrates that the mixture containing powdered cation and anion exchange resins, ion exchange fibers, and cellulose fibers (Example 3) is superior in many applications to the mixture which contains powdered cation and anion exchange resins and relatively inert cellulose fibers (Example 1). The mixture of Example 3 provided a dramatically longer run (Run 5) to a pressure drop end point, although with some increase in bleedthrough as compared to the mixture of Example 1.

EXAMPLE 4

The procedure described in Example 1 was again performed, this time using an equal parts mixture of BH-20 cellulose fibers and Ionex ion exchange fibers, based upon dry weight, and designated Run 6. The cellulose fiber (BH-20) was stirred in water with 0.015 mL of cationic polyelectrolyte concentrate (Betz 1175, Betz Laboratories, Trevose, Pa.) per dry gram of fiber. The polyelectrolyte was prediluted for better dispersion. To the treated cellulose was added an equal weight of Ionex fiber, for a slurry concentration of about 10 percent. The mixture was stirred and dewatered by vacuum, then added to a precoat tank and recirculated through a filter element to produce a precoat.

Figure 8:
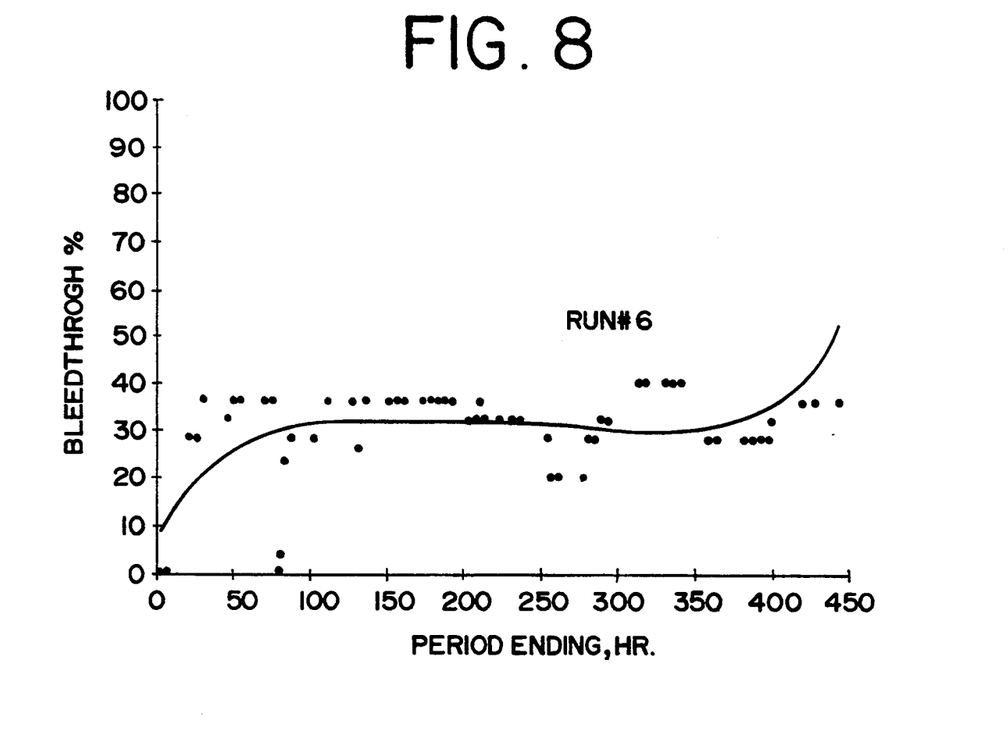
FIG. 8 is a graph showing percentage bleed-through for Run 6 as a function of time.
Figure 9:
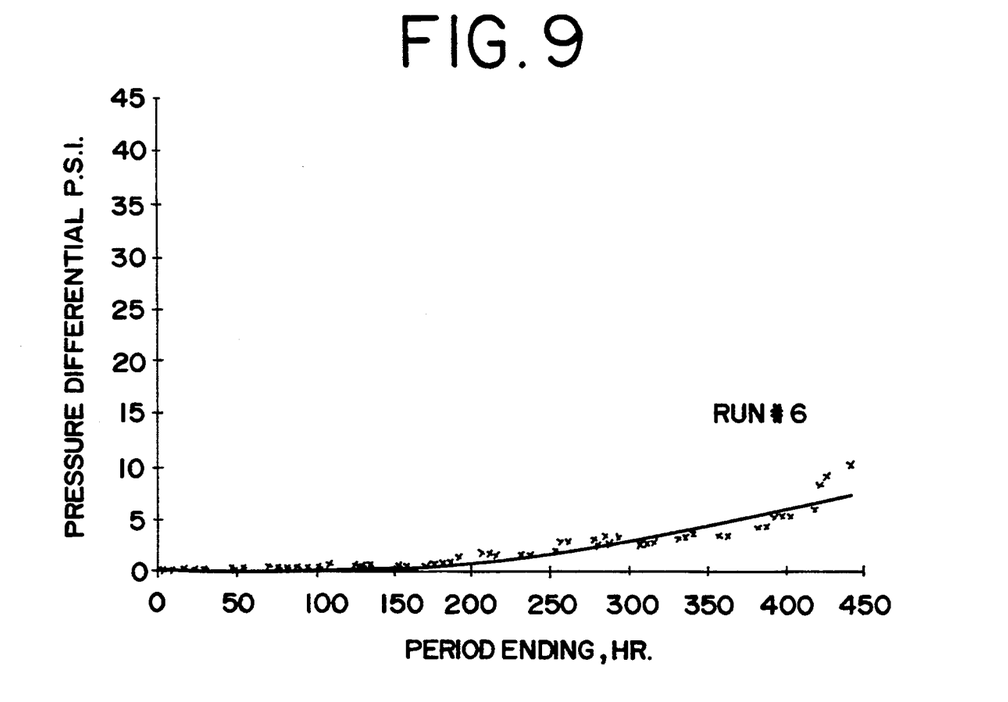
FIG. 9 is a graph showing pressure drop across a precoat and a filter element for Run 6 as a function of time.

Bleedthrough data for Run 6 is presented in FIG. 8. Pressure drop data for Run 6 is shown in FIG. 9.

EXAMPLE 5

The procedure described in Example 1, above, was performed for a sample that contained only cellulose fibers. The cellulose fiber-only precoat was prepared as follows. In container A, 76 parts by weight of cellulose fiber, 1 part of cationic polyelectrolyte concentrate (Betz 1175; Betz Laboratories, Trevose, Pa.) and one part of anionic polyelectrolyte concentrate (Acrysol A-3, Rohm and Haas, Philadelphia, Pa.) were added in that order to water for a solids content of about 10 percent and mixed. In container B, 76 parts by weight of cellulose fiber and 1 part of the cationic polyelectrolyte concentrate were added in that order to water for a solids content of about 10% and mixed. The polyelectrolytes were prediluted for better dispersion. Containers A and B were mixed, and the resultant slurry was dewatered by vacuum. This is according to the teachings of U.S. Pat. No. 4,177,142.

Figure 10:
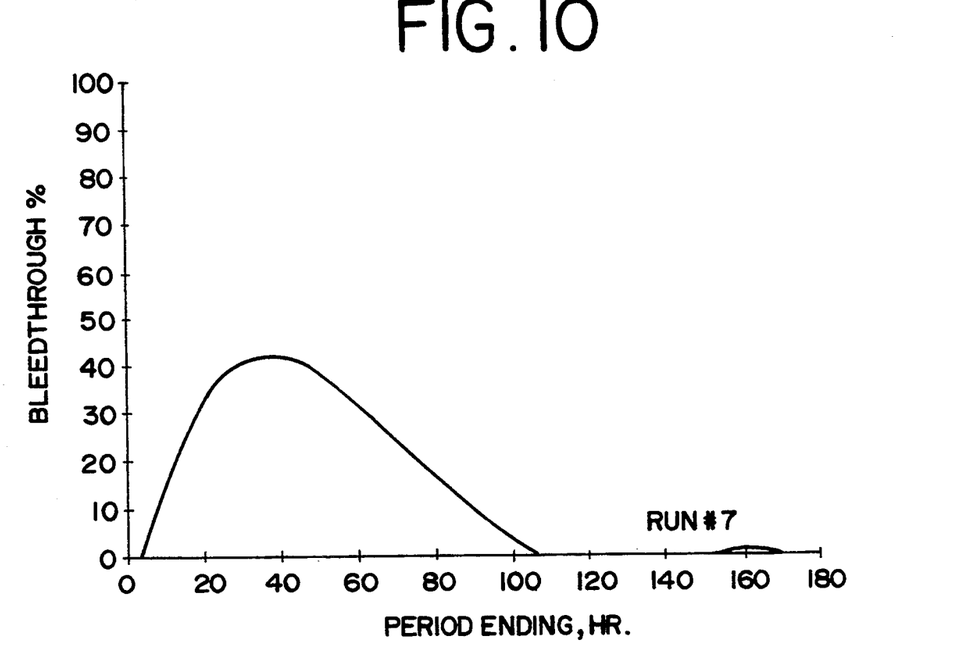
FIG. 10 is a graph showing bleed-through for Run 7 as a function of time.
Figure 11:
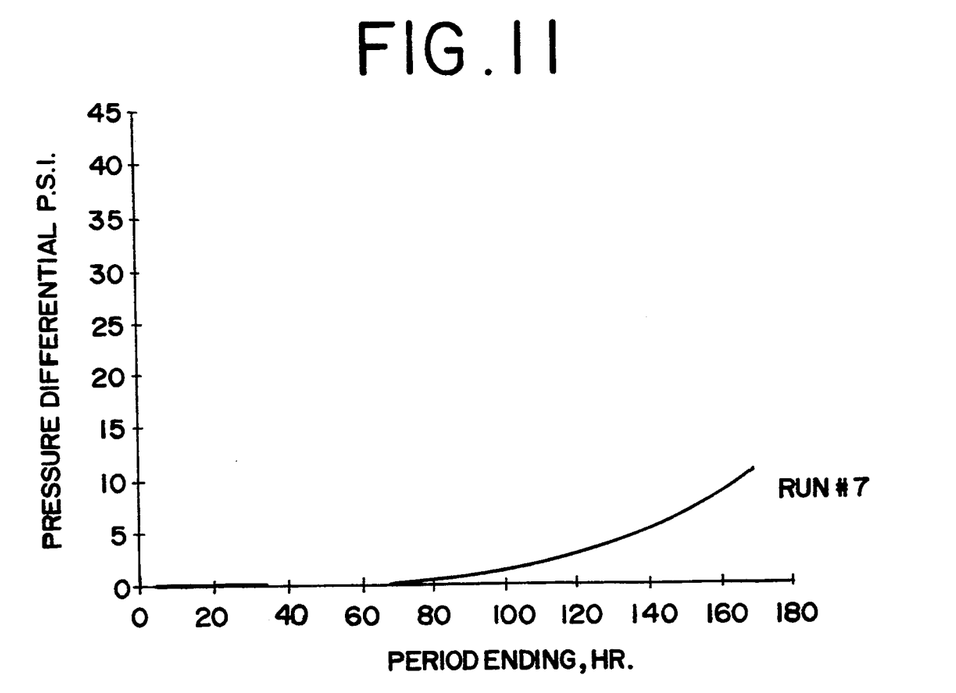
FIG. 11 is a graph showing pressure drop across a precoat and a filter element for Run 7 as a function of time.

The resulting data is illustrated as Run 7 in FIGS. 10 and 11. Compared with the performance observed in Example 4, the cellulose fibers exhibited relatively high bleedthrough and short run length.

EXAMPLE 6

The procedure described in Example 1 above was attempted with a sample that contained only ion exchange fibers, which were commercially obtained. The ion exchange fibers were obtained dry and mixed with water. However, the sample did not form a precoat when recirculated through the filter element and the attempt was, accordingly, abandoned.

The Examples and theories set forth above are provided to communicate the invention, and do not limit the subject matter of the appended claims. The teachings of all patents incorporated by reference herein are incorporated in their entirety. Many modifications and variations of the invention as hereinbefore set forth will occur to those skilled in the art upon reading this description, and it is intended to cover in the appended claims all such modifications and variations as fall within the true spirit and scope of the invention.

What is claimed is:

1. A method for removing ionic and suspended particulate impurities from a liquid containing said impurities, comprising:
   dispersing freely flowing ion exchange fibers and inert fibers in a liquid medium to produce a precoat slurry;
   depositing the slurry on a filter support and carrying away at least a portion of the liquid medium to produce a precoated bed comprising a clumped mixture of the ion exchange fibers and the inert fibers; and
   directing a liquid containing ionic and suspended particulate impurities through the bed.

2. The method as defined in claim 1 wherein the inert fibers are cellulose fibers.

3. The method as defined in claim 1 wherein the inert fibers are treated with a polyelectrolyte to produce a clumping phenomenon.

4. The method as defined in claim 1 wherein the ion exchange fibers are cation exchange fibers.

5. The method as defined in claim 1 wherein the ion exchange fibers are anion exchange fibers.

6. The method as defined in claim 1 wherein the ion exchange fibers are a mixture of cation exchange fibers and anion exchange fibers.

7. The method as defined in claim 1 wherein the bed comprises in the range of about twenty percent by weight to about eighty percent by weight ion exchange fibers, based upon the total dry weight of the feed.

8. The method as defined in claim 7 wherein the bed comprises in the range of about thirty three percent by weight to about sixty six percent by weight ion exchange fibers, based on the total dry weight of the bed.

9. The method as defined in claim 8 wherein the bed comprises in the range of about one percent by weight to about ninety percent by weight of ion exchange resin particles having an effective diameter substantially in the range of about one micron to about three hundred microns, based on the total dry weight of the bed.

10. A method for removing ionic and suspended particulate impurities from a liquid containing said impurities, comprising:
dispersing freely flowing ion exchange particles, ion exchange fibers, and relatively inert fibers in a liquid medium to produce a precoat slurry;
depositing the slurry on a filter support and carrying away at least a portion of the liquid medium to produce a precoated bed comprising a clumped mixture of the ion exchange particles, the ion exchange fibers and the inert fibers; and
directing a liquid containing ionic and suspended particulate impurities through the bed.

11. The method as defined in claim 10 wherein the inert fibers are cellulose fibers.

12. The method as defined in claim 10 wherein the inert fibers are treated with a polyelectrolyte to produce a clumping phenomenon.

13. The method as defined in claim 10 wherein the ion exchange fibers are cation exchange fibers.

14. The method as defined in claim 10 wherein the ion exchange fibers are anion exchange fibers.

15. The method as defined in claim 10 wherein the ion exchange fibers are a mixture of cation exchange fibers and anion exchange fibers.

16. The method as defined in claim 10 wherein the ion exchange particles are cation exchange resin particles.

17. The method as defined in claim 10 wherein the ion exchange particles are anion exchange resin particles.

18. The method as defined in claim 10 wherein the ion exchange particles are a mixture of anion exchange resin particles and cation exchange resin particles.

19. The method as defined in claim 10 wherein the bed comprises at least about five percent by weight inert fibers, based on the total dry weight of the bed.

20. The method as defined in claim 19 wherein the bed comprises in the range of about ten percent by weight to about thirty percent by weight inert fibers, based on the total dry weight of the bed.

21. The method as defined in claim 10 wherein the bed comprises in the range of about five percent by weight to about sixty percent by weight ion exchange fibers, based on the total dry weight of the bed.

22. The method as defined in claim 21 wherein the bed comprises in the range of about five percent by weight to about thirty percent by weight ion exchange fibers, based on the total dry weight of the bed.

23. The method as defined in claim 10 wherein the bed comprises in the range of about one percent by weight to about ninety percent by weight of ion exchange resin particles having an effective diameter in the range of about one micron to about three hundred microns.

24. The method of claim 24 wherein about one percent by weight to about ten percent by weight of said resin particles have an effective diameter in the range of about one to about twenty microns, based on the total dry weight of said resin particles.

25. A filter for removing ionic and suspended particulate impurities from a liquid, comprising: a filter support and a precoated bed including a clumped mixture of ion exchange particles, ion exchange fibers, and inert fibers.

26. The filter of claim 25 wherein the inert fibers are cellulose fibers.

27. The filter of claim 25 wherein said inert fibers are treated with a poly-electrolyte to produce a clumping phenomenon.

28. The filter of claim 25 wherein the ion exchange fibers are a mixture of cation exchange fibers and anion exchange fibers.

29. The filter of claim 23 wherein the ion exchange fibers are a mixture of cation exchange particles and anion exchange particles.

30. The filter of claim 25 wherein said bed comprises at least about five percent of inert fibers.

31. The filter of claim 30 wherein said bed comprises in the range of about ten percent by weight to about thirty percent by weight inert fibers, based on the total dry weight of the bed.

32. The filter of claim 25 wherein said bed comprises in the range of about five percent by weight to about sixty percent by weight ion exchange fibers, based in the total dry weight of the bed.

33. The filter of claim 32 wherein said bed comprises in the range of about five percent by weight to about thirty percent by weight ion exchange fibers, based on the total dry weight of the bed.

34. The filter of claim 25 wherein said bed comprises in the range of about one percent by weight to about ninety percent by weight of ion exchange particles, based on the total dry weight of the bed, having a weight average effective diameter in the range of about one to about three hundred microns.

35. The filter of claim 34 wherein about one percent by weight to about ten percent by weight of said resin particles have an effective diameter in the range of about one to about twenty microns.

* * * * *